UNITED STATES PATENT OFFICE.

GADIENT ENGI AND HERMAN KRAFT, OF BASEL, SWITZERLAND, ASSIGNORS TO THE FIRM OF SOCIETY OF CHEMICAL INDUSTRY IN BASLE, OF BASEL, SWITZERLAND.

TRICHLORINDIGO AND PROCESS OF MAKING SAME.

No. 899,863.　　　　　Specification of Letters Patent.　　Patented Sept. 29, 1908.

Application filed April 20, 1908. Serial No. 428,243.

*To all whom it may concern:*

Be it known that we, GADIENT ENGI, doctor of philosophy and chemist, a citizen of the Swiss Republic, and resident of Basel, Switzerland, and HERMAN KRAFT, doctor of philosophy and chemist, a subject of the Emperor of Austria-Hungary, and a resident of Basel, Switzerland, have invented a new and useful Trichloro Derivative of Indigo and a Process of Making Same, of which the following is a full, clear, and exact specification.

Hitherto nothing has been known relatively to trichloro derivatives of indigo. We have now found, that a trichlorindigo can be prepared by a direct chlorination of indigo, when indigo suspended in an aromatic nitrohydrocarbon, as for instance nitrobenzene, is treated with chlorin in presence of a suitable agent capable to transmit halogen, for instance the antimony chlorids. This result is the more surprising as according to the indication of the German Patent 160817 the treatment of indigo suspended in anhydrous indifferent solvents, as for instance carbon tetrachlorid, with chlorin in presence of an agent capable to transmit chlorin gives only chlorinated products of decomposition which lose their chlorin by their treatment or boiling with soda lye.

The new process is illustrated by the following example: 26.2 parts of indigo are suspended in 100 parts of nitrobenzene; to this suspension 10 parts antimony pentachlorid are added and hereafter 27 parts of chlorin are introduced in the mixture while stirring and cooling with ice. The chlorinated product is separated by filtration and suction, boiled with alcohol and dried. The violet powder of bronze luster thus obtained consists principally of trichlorindigo. It dissolves in cold concentrated sulfuric acid with greenish blue coloration turning to pure blue on heating. It is hardly soluble in alcohol, and very difficultly soluble in chloroform and benzene to a blue solution. It dissolves sufficiently easily in nitrobenzene to a reddish blue solution; by cooling down this solution the dyestuff crystallizes in the form of small needles. By its treatment with an alkali and a hydrosulfite it yields a yellowish vat dyeing unmordanted cotton vivid blue tints fast to washing, light and chlorin.

What we claim is:

1. The herein described process for the manufacture of trichlorinated indigo, which consists in treating indigo suspended in an aromatic nitrohydrocarbon with chlorin in presence of a suitable agent capable of transmitting a halogen.

2. The herein described process for the manufacture of trichlorinated indigo, which consists in treating indigo suspended in nitrobenzene with chlorin in presence of an antimony chlorid.

3. As a new product, the described trichlorindigo, which constitutes, in a dry state, a violet powder of a bronze luster, insoluble in water, difficultly soluble in chloroform and benzene, more easily in hot nitrobenzene with a reddish blue color, dissolving in concentrated sulfuric acid with a greenish blue coloration and yielding by its treatment with suitable reducing agents yellowish vats dyeing unmordanted cotton in vivid blue shades, fast to washing, light and chlorin.

In witness whereof we have hereunto signed our names this fourth day of April 1908, in the presence of two subscribing witnesses.

GADIENT ENGI.
　　　　　　　　　　HERMAN KRAFT

Witnesses:
　ARNOLD ZUBER,
　AMAND RITTER.